(12) United States Patent
Mikacich

(10) Patent No.: US 10,342,211 B2
(45) Date of Patent: Jul. 9, 2019

(54) FELINE LITTER BOX SIEVE SYSTEM

(71) Applicant: Coburn Mikacich, Orlando, FL (US)

(72) Inventor: Coburn Mikacich, Orlando, FL (US)

( * ) Notice: Subject to any disclaimer, the term of this patent is extended or adjusted under 35 U.S.C. 154(b) by 238 days.

(21) Appl. No.: 15/401,271

(22) Filed: Jan. 9, 2017

(65) Prior Publication Data
US 2018/0192609 A1    Jul. 12, 2018

(51) Int. Cl.
*B07B 1/34*    (2006.01)
*A01K 1/01*    (2006.01)

(52) U.S. Cl.
CPC .......... *A01K 1/0114* (2013.01); *A01K 1/0107* (2013.01); *B07B 1/34* (2013.01)

(58) Field of Classification Search
CPC .... A01K 1/0107; A01K 1/0114; B07B 13/16; B07B 1/34
USPC ......... 119/162, 166; 209/235, 260, 348, 420
See application file for complete search history.

(56) References Cited

U.S. PATENT DOCUMENTS

| | | | | |
|---|---|---|---|---|
| 1,415,575 A | * | 5/1922 | Kamenstein | .......... F24B 15/007 |
| | | | | 209/260 |
| 1,416,022 A | | 5/1922 | Hartley | |
| 3,735,735 A | * | 5/1973 | Noroian | ................ A01K 1/0107 |
| | | | | 119/165 |
| 3,752,120 A | | 8/1973 | Pallesi | |
| 3,990,397 A | * | 11/1976 | Lowe, Jr. | .............. A01K 1/0107 |
| | | | | 119/165 |
| 4,972,800 A | * | 11/1990 | Bennett | ................. A01K 1/0107 |
| | | | | 119/166 |
| 5,011,026 A | | 4/1991 | Hausman et al. | |
| 5,032,254 A | * | 7/1991 | Deboer | ................ A01K 1/0107 |
| | | | | 119/161 |
| 5,048,465 A | * | 9/1991 | Carlisi | .................... A01K 1/011 |
| | | | | 119/161 |
| 5,211,133 A | * | 5/1993 | Foley | .................... A01K 1/0114 |
| | | | | 119/165 |
| 5,440,978 A | * | 8/1995 | O'Brien | ................ B30B 9/3032 |
| | | | | 100/229 A |
| 5,642,814 A | | 7/1997 | Nelson | |
| 5,690,051 A | | 11/1997 | Fisher et al. | |
| 6,269,772 B1 | | 8/2001 | Mickey | |
| 6,295,948 B1 | * | 10/2001 | Bowron | ................ A01K 1/0107 |
| | | | | 119/165 |
| 6,615,765 B1 | * | 9/2003 | Thomas | ................ A01K 1/0107 |
| | | | | 119/161 |
| 7,228,818 B2 | * | 6/2007 | Lynch | .................. A01K 1/0107 |
| | | | | 119/168 |
| 9,027,761 B2 | | 5/2015 | Wyrostek | |
| 9,615,538 B2 | * | 4/2017 | Shamir | ................ A01K 1/0114 |
| 9,681,638 B1 | * | 6/2017 | Harris | ...................... A01K 1/01 |
| 9,713,315 B2 | * | 7/2017 | Sweetman | ........... A01K 1/0107 |

(Continued)

*Primary Examiner* — Peter M Poon
*Assistant Examiner* — Danielle A Clerkley
(74) *Attorney, Agent, or Firm* — Mark Young, P.A.

(57) ABSTRACT

A feline litter box sieve system includes a screened lid connected by a hinge to a support frame that suspends an empty litter box in the top opening of a trash receptacle. L-shaped hooks suspend the support frame in the trash receptacle. Used litter is poured from a full litter box onto the screen. Clumps and feces are retained by the screen. Pivoting the lid to an open position dumps retained clumps and feces from the screen into the trash receptacle. While the lid is open, the held litter box containing unclumped sifted litter may be removed for use.

20 Claims, 18 Drawing Sheets

(56) References Cited

U.S. PATENT DOCUMENTS

2006/0037548 A1\* 2/2006 Mohr .................. A01K 1/0107
119/166
2013/0313256 A1\* 11/2013 Brown ................ B65F 1/1607
220/254.3
2016/0325314 A1\* 11/2016 Harpel ..................... B07B 1/02

\* cited by examiner

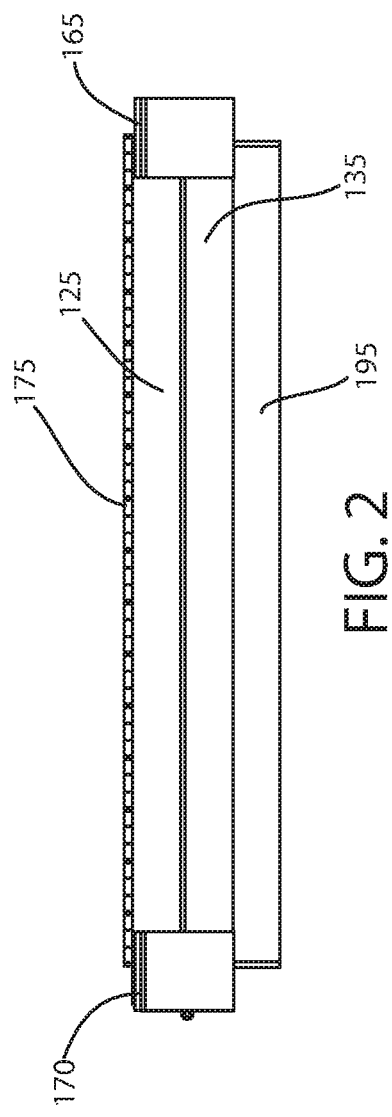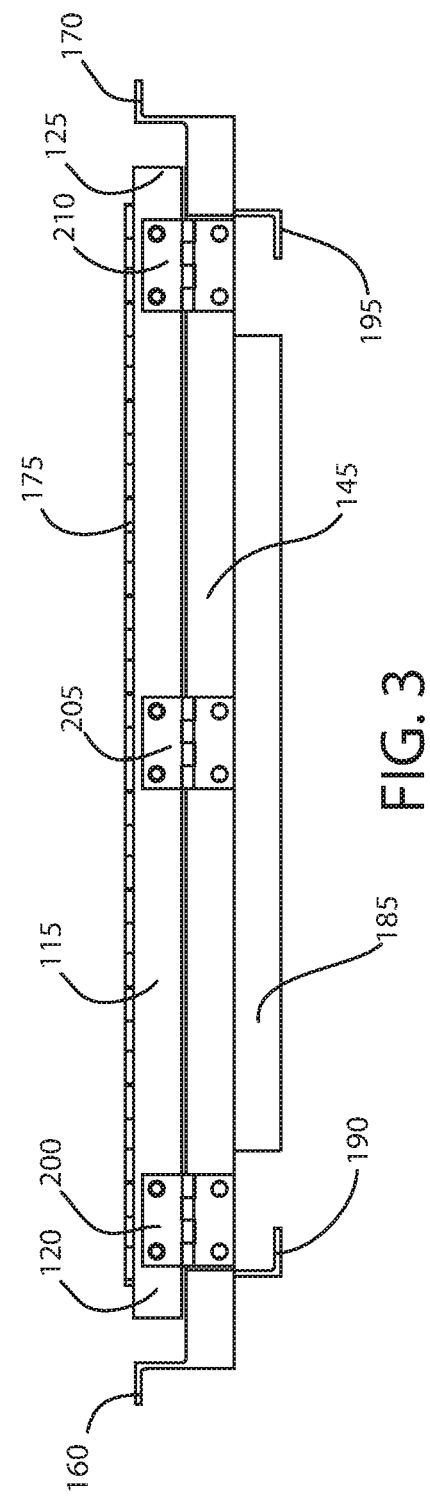

FELINE LITTER BOX SIEVE SYSTEM

FIELD OF THE INVENTION

This invention relates generally to feline litter boxes and more particularly to a litter sieve assembly.

BACKGROUND

A house cat owner must frequently change litter in a litter box. A litter box contains litter, typically a clay-based substance that clumps when wet. Often, the litter box is lined with a plastic bag liner, to facilitate discarding and replacing the litter.

The cat performs its excretory functions while standing on the cat litter. Cat urine soaks into the cat litter forming clumps. The cat typically buries the excrement beneath the surface of the litter.

To avoid unsanitary conditions and malodors, such clumps and buried excrement must be removed. Failure to do so no only results in highly unpleasant odors, but risks rejection of the litter box, particularly by fastidious felines.

To facilitate removal of noxious clumps of urine soaked litter and excrement, handheld sieves have been devised. These devices resemble a small shovel with a perforated scoop. The perforations typically comprise elongated parallel openings, through which unclumped litter may fall back into the box, while clumped litter and excrement is removed. Unfortunately, however, the act of thrusting the scoop into the litter tends to rip the liner and break apart clumps into small pieces. This causes much of urine soaked clumps to remain in the litter box. Additionally, many clumps and excrement droppings are easily missed by scoop. Furthermore, the process of scooping is time consuming and tedious.

What is needed is a system of sifting all clumps and excrement from the litter, quickly and reliably. Such a system should save the remaining unclumped and excrement-free litter for re-use, while discarding the clumped litter and excrement.

The invention is directed to overcoming one or more of the problems and solving one or more of the needs as set forth above.

SUMMARY OF THE INVENTION

To solve one or more of the problems set forth above, in an exemplary implementation of the invention, a feline litter box sieve system includes an assembly that is configured (i.e., sized and shaped) to be suspended in the top opening of a trash receptacle and to suspend a litter box with a flanged (i.e., flanged, rolled or bulbous) top edge in the top opening. The assembly includes a support frame, i.e., a rectilinear framework sized to fit within the top opening of the trash receptacle. The framework has opposed front and back sides and opposed first and second sides. A plurality of inwardly extending opposed flanges define a space therebetween for receiving the litter box. The plurality of inwardly extending opposed flanges are sized and positioned to support the litter box by the top flanged edge of the litter box. A plurality of suspension hooks are attached to the support frame. The suspension hooks are positioned and sized to suspend the support frame from the top edge of the trash receptacle. A lid is pivotally attached at the back side of the support frame. The lid includes a screen top with apertures. The lid is moveable by pivoting from a closed position substantially parallel to and abutting the support frame to an open position at an angle relative to the support frame. The apertures are positioned over the space defined between the inwardly extending opposed flanges when the lid is in the closed position. The distance from the front side to the back side of the support frame is less than the distance from the front to the opposed back of the top edge of the trash receptacle. The lid has a front edge, an opposed back edge, a first side edge and an opposed second side edge. The distance between the front side and back side of the support frame is about the same as a distance between the front edge and back edge of the lid. The distance between the first side and second side of the support frame is about the same as a distance between the first side edge and second side edge of the lid. The apertures of the screen top are sized to prevent passage of feline feces and clumped litter.

The lid may be pivotally attached at the back side of the support frame with a hinge or a plurality of hinges. The screen top of the lid may be expanded metal sheet. Each of the plurality of suspension hooks may be an inverted L-shaped member with a substantially horizontal top segment and a substantially vertical segment extending downwardly from the substantially horizontal top segment, the substantially vertical segment being connected to the rectilinear framework of the support frame. Each substantially vertical segment may be connected to the rectilinear framework of the support frame by a coupling extending outwardly from the rectilinear framework of the support frame. Optionally, a stay may connect the lid to the support frame and defining a limit of pivoting motion of the lid relative to the support frame. Also optionally, a handle may be attached to the lid.

In practice, two litter boxes are used with the exemplary litter sieve assembly according to principles of the invention. One litter box is suspended by the flanges of the support frame, while the assembly is suspended by the suspension hooks from the top edges of a trash receptacle. The other litter box contains used soiled litter which will poured onto the screen top of the closed lid. After pouring, this other litter box is empty (i.e., substantially empty), no longer containing soiled litter. Clumped litter and feces caught by the screen top of the lid may be dumped from the lid into the trash receptacle by raising the lid to an open position. The clumps and feces slide, roll, tumble and fall from the inclined lid into the trash receptacle. Unused litter that passes through the screen, falls into the litter box suspended from the support frame. That suspended litter box may then be removed (by lifting) from the assembly while the lid is open. That litter box, which now contains the unused (i.e., unclumped) litter, may be used as a cat litter box. If the amount of sifted unused litter is insufficient for use by cats, additional clean litter may be added to the box. Thereafter, the emptied litter box may then be suspended from the support frame while the assembly is suspended on the top edges of a trash receptacle and used to catch unused litter.

BRIEF DESCRIPTION OF THE DRAWINGS

The foregoing and other aspects, objects, features and advantages of the invention will become better understood with reference to the following description, appended claims, and accompanying drawings, where:

FIG. 2 provides a side view of an exemplary litter sieve assembly in a closed position according to principles of the invention.

FIG. 3 provides a back view of an exemplary litter sieve assembly in a closed position according to principles of the invention.

Those skilled in the art will appreciate that the figures are not intended to be drawn to any particular scale; nor are the figures intended to illustrate every embodiment of the invention. The invention is not limited to the exemplary embodiments depicted in the figures or the specific components, configurations, shapes, relative sizes, ornamental aspects or proportions as shown in the figures.

DETAILED DESCRIPTION

Figure 1:
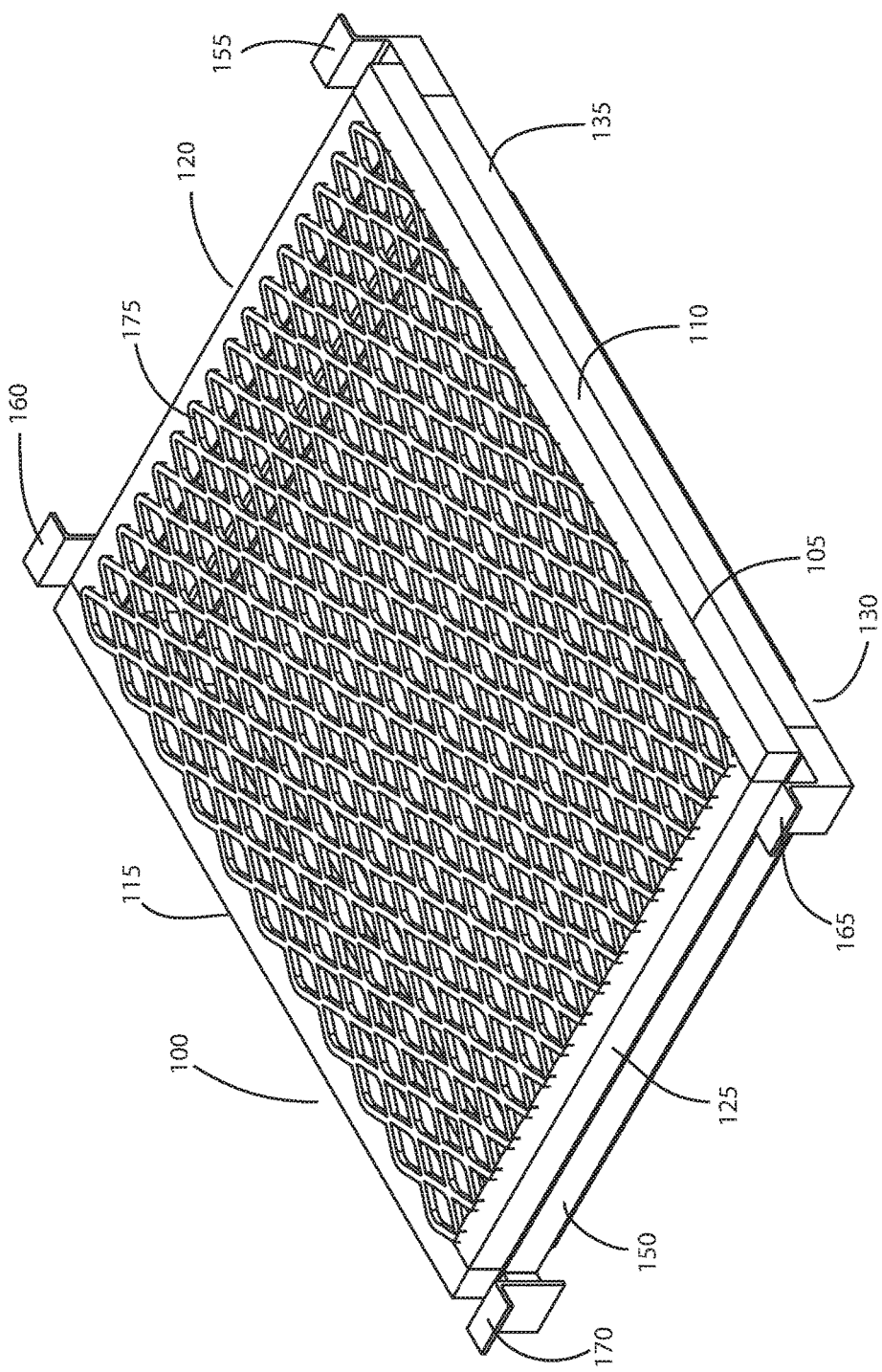
FIG. 1 provides a top front perspective view of an exemplary litter sieve assembly in a closed position according to principles of the invention.
Figure 4:
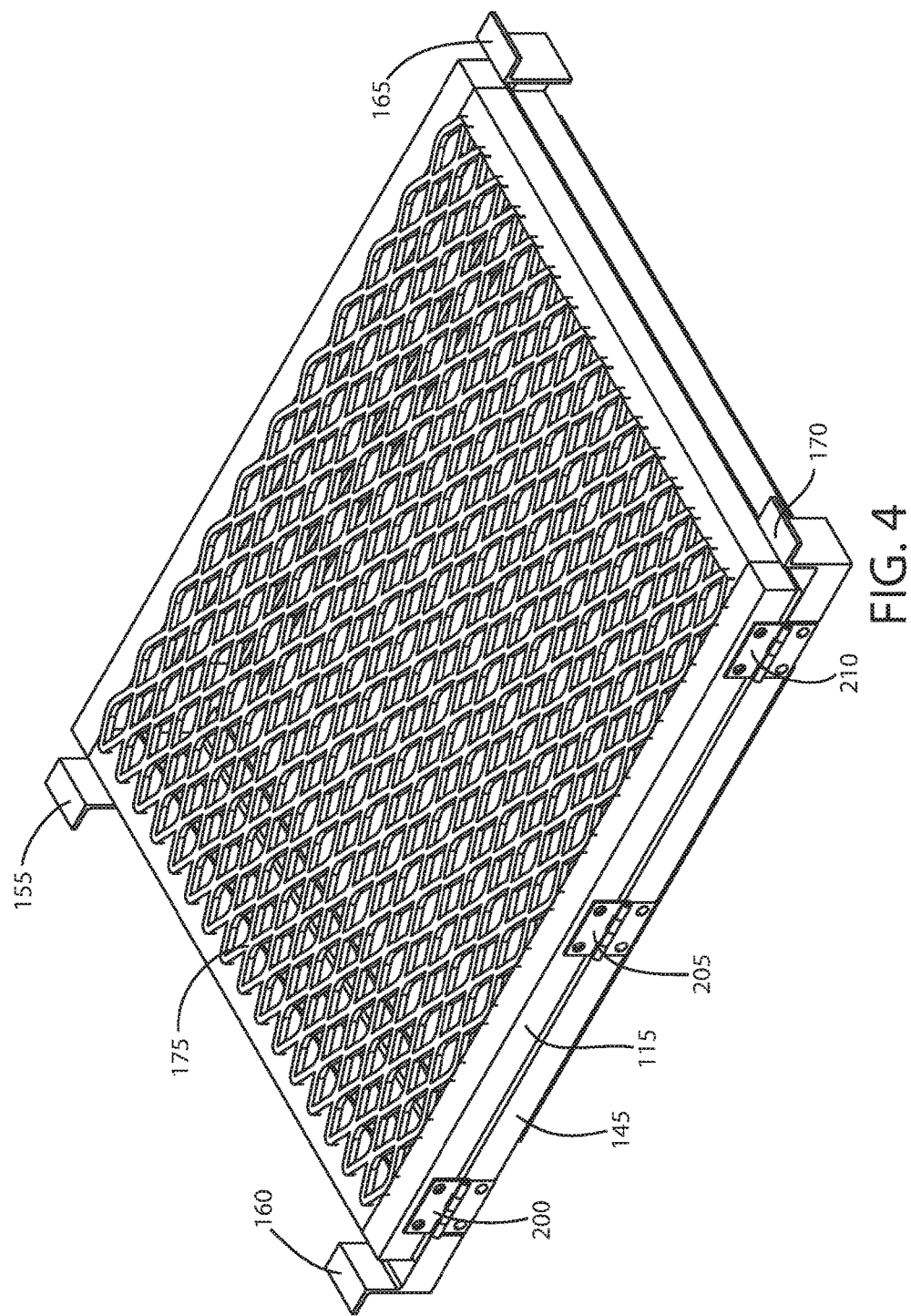
FIG. 4 provides a top back perspective view of an exemplary litter sieve assembly in a closed position according to principles of the invention.
Figure 5:
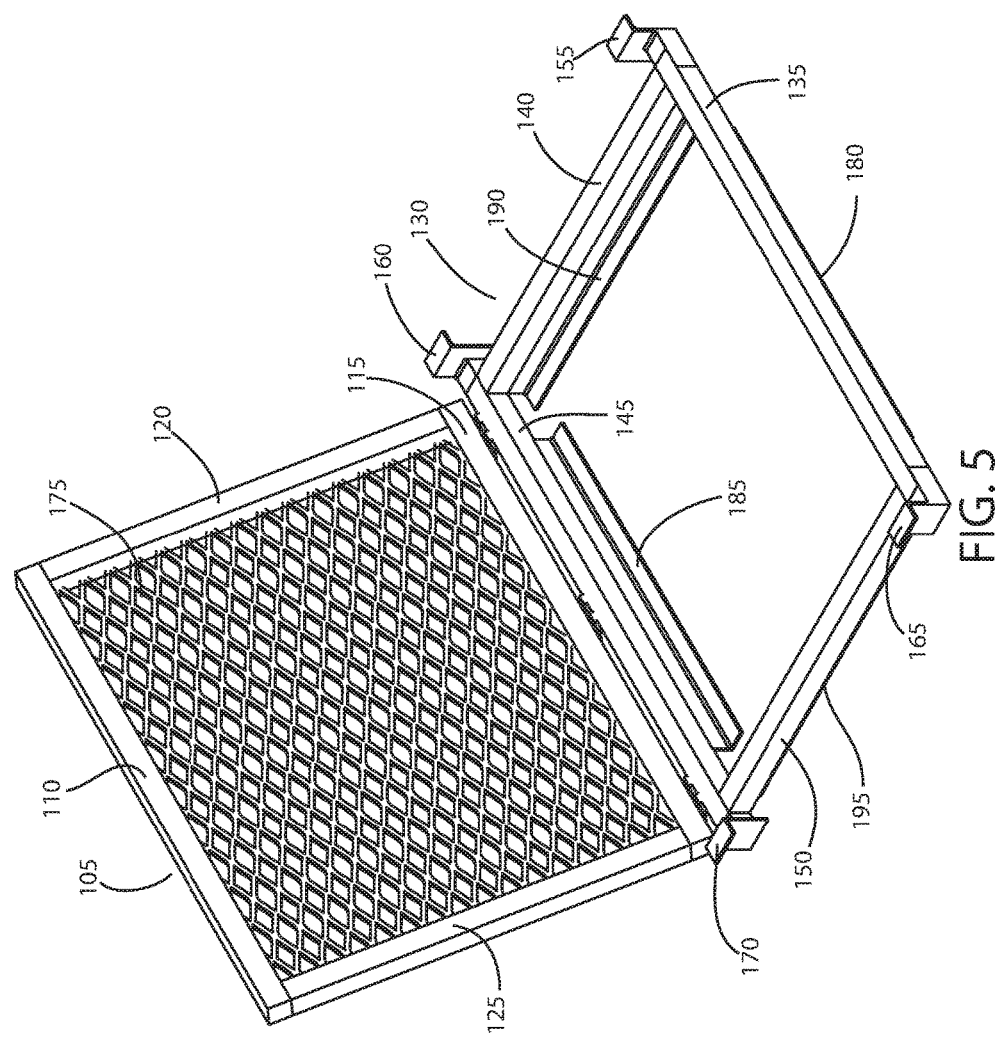
FIG. 5 provides a top front perspective view of an exemplary litter sieve assembly in an open position according to principles of the invention.
Figure 6:
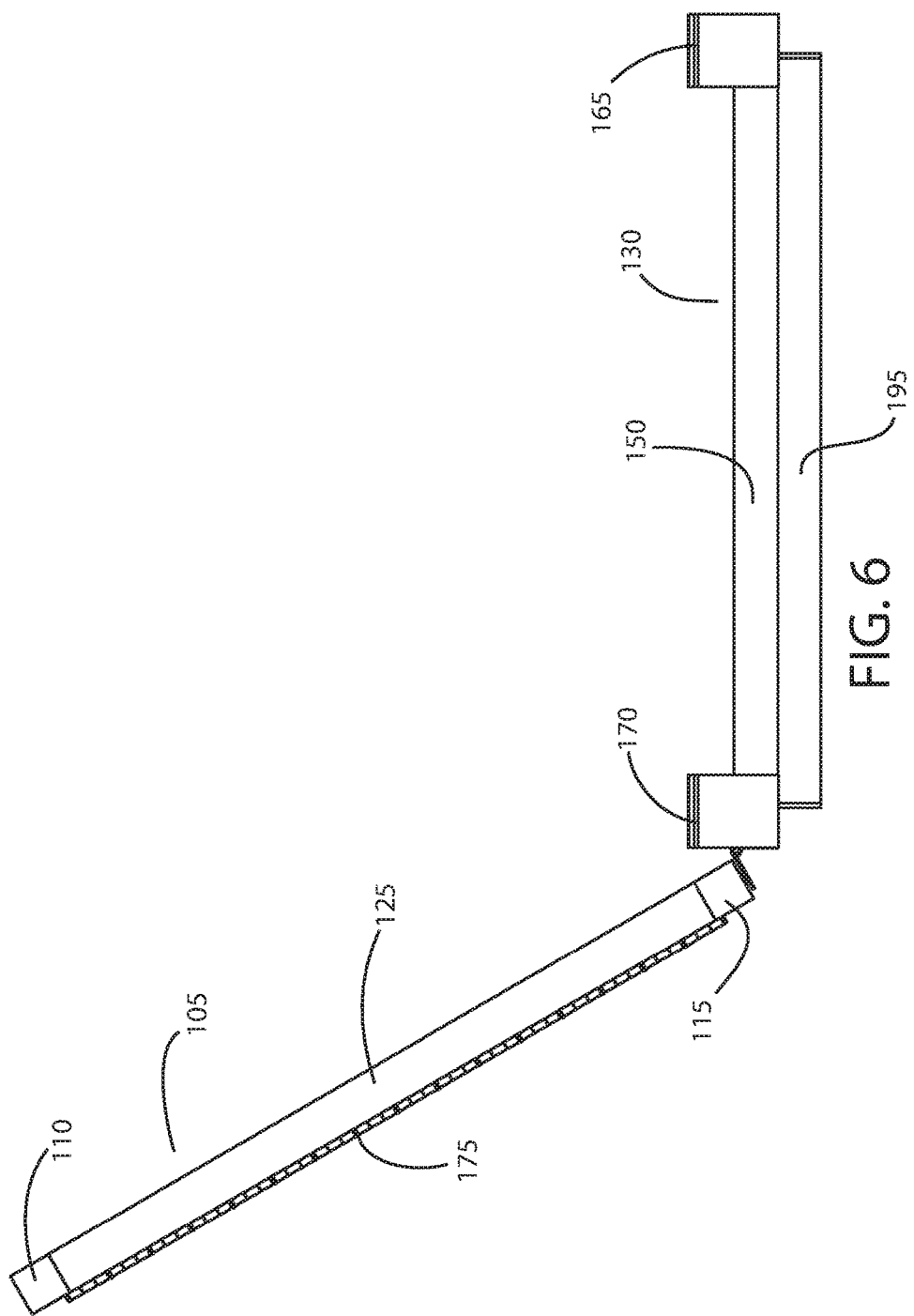
FIG. 6 provides a side view of an exemplary litter sieve assembly in an open position according to principles of the invention.
Figure 7:
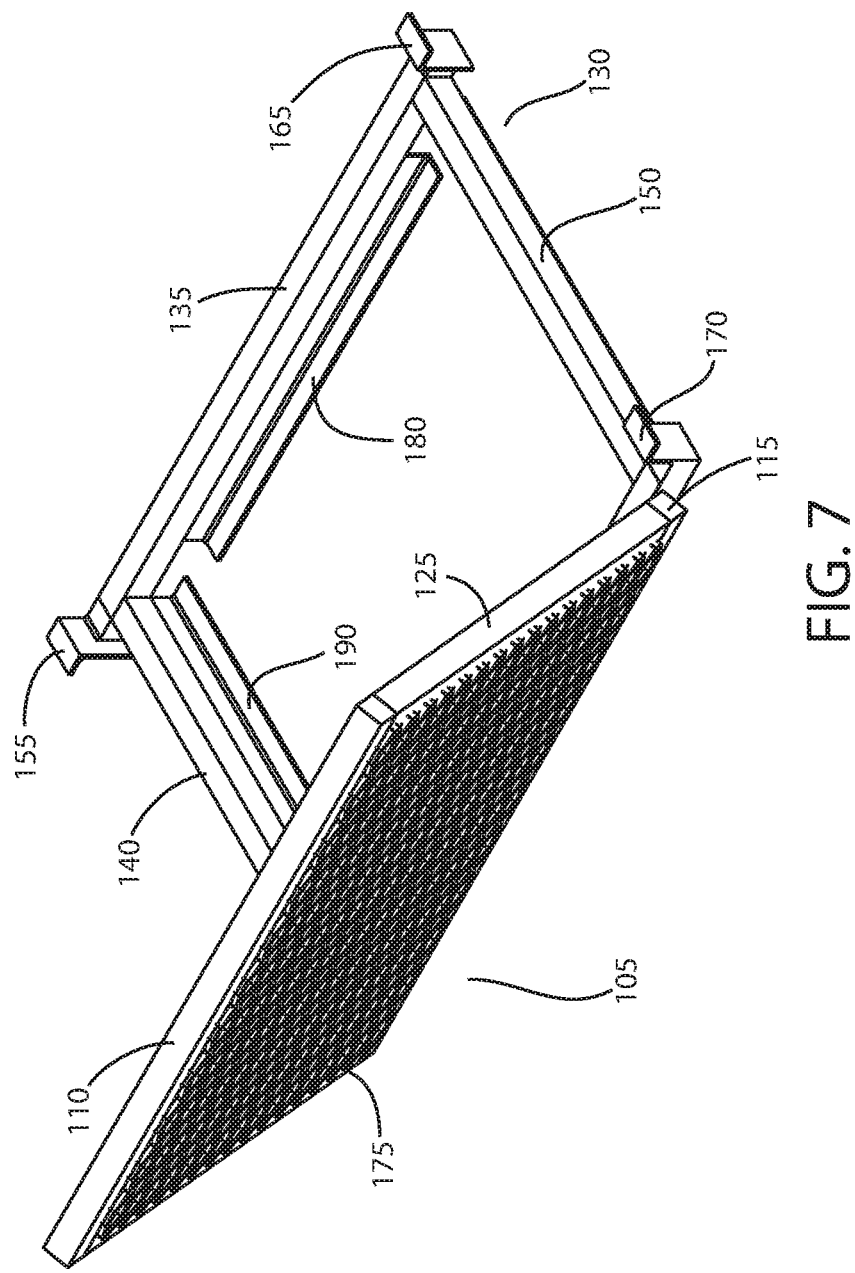
FIG. 7 provides a top back perspective view of an exemplary litter sieve assembly in an open position according to principles of the invention.

FIG. 1 provides a top perspective view of an exemplary litter sieve assembly in a closed position according to principles of the invention. The sieve assembly includes 2 subassemblies—a lid 105 and a support frame 130.

The support frame 130 is a generally rectangular cross section rectilinear framework sized to be received in a trash receptacle. More particularly, the frame 130 is small enough to fit into the top opening of a trash receptacle while support hooks, 155, 160, 165, 170 grip top edges of the trash receptacle.

The framework of the support frame 130 is comprised of structural linear segments, such as triangular, rectangular, circular, elliptical, channel or L-shaped cross-section steel or aluminum segments. In a nonlimiting example, hollow rectangular cross-section steel (HSS) or aluminum segments 135, 140, 145 and 150 are mechanically fastened together at their ends using welds or fasteners. The segments are fastened into a generally rectangular frame with an opening that is defined by the inner periphery of the frame and sized to receive a litter box, and an outer periphery of the frame that is sized to fit within the top opening of a trash receptacle.

With reference to FIGS. 2 and 3, the support frame 130 includes at least a pair, or optionally a plurality of pairs, of opposed support flanges. Two opposed pairs 180, 185 and 190, 195 are shown in FIGS. 2, 3, 5 and 7. The support flanges 180, 185 and 190, 195 are positioned, sized and shaped to engage top edges of a litter box. Litter boxes are typically equipped with a curved, rolled or flanged top edge. Furthermore, they typically taper towards the bottom to provide a molding release draft angle. The space between opposed support flanges is sufficient for all but the top edges of the litter box to pass through. Thus, the flanges 180, 185 and 190, 195 support/suspend a litter box in the trash receptacle. A litter box 300 is shown suspended from the flanges 180, 185 and 190, 195 in the side and perspective views of FIGS. 8 and 9 as well as in the section view of FIG. 10. The engaged flanged or rolled top edges 305, 310, 315 of the suspended litter box 300 are shown in FIG. 10.

While the flanges 180, 185 and 190, 195 are illustrated as structures extending below the framework of the support frame 130, they may actually comprise the support frame. By way of example, and not limitation, the support frame may be constructed of angles (i.e., angle metal segments), each having a vertical wall and a bottom horizontal wall. The bottom horizontal walls may serve as the flanges to suspend a litter box.

A plurality of hooks extend from the sides 140, 150 of the support frame 130. In the exemplary embodiment illustrated in the figures, four separate hooks 155, 10, 15, 170 are shown. However, two elongated hooks (one per side) may be used. Alternatively, more than two hooks may be used. Each hook is an inverted L-shaped bracket. The top horizontal portion of the inverted L-shaped bracket rests on top edge of the trash receptacle. Thus, the brackets extend outwardly from the sides 140, 150 a sufficient distance for the free end of the top horizontal portion of the inverted L-shaped bracket to extend onto, and preferably beyond, the top edge of the trash receptacle. The distance by which the brackets extend outwardly depend upon the size of the particular trash receptacle. The outward extension is provided by extensions protruding from sides 140, 150, or by extended length front and back segments 135, 145, or by elongated top horizontal portions of the inverted L-shaped brackets.

The lid 105 is connected with hinges (hingedly mounted or pivotally mounted) to the support frame 130. With reference to FIG. 3, one or more hinges 200, 205, 210 couple the back 120 of the lid 105 to the back 145 of the support frame 130. While three barrel hinges 200, 205, 210 are illustrated, other numbers and types of pivot couplings may be used without departing from the scope of the invention, including without limitation pivot hinges, continuous (piano) hinges, and strap hinges. The hinges allow the lid 105 to be opened by pivoting about the barrel of the hinge.

The lid 105 is a generally rectangular cross section rectilinear framework having a size about the same as the support frame 130. More particularly, the lid 105 is small enough to fit into the top opening of a trash receptacle on top of the support frame 130.

The framework of the lid 105 is comprised of structural linear segments, such as triangular, rectangular, circular, elliptical, channel, I-, T- or L-shaped cross-section structural steel or aluminum segments. In a nonlimiting example, hollow rectangular cross-section steel (HSS) or aluminum segments 110, 115, 120 and 125 are mechanically fastened together at their ends using welds or fasteners. The segments are fastened into a generally rectangular frame with an opening that is defined by the inner periphery of the frame and sized to receive a litter box, and an outer periphery of the frame that is sized to fit within the top opening of a trash receptacle.

A screen 175 is mounted on top of the lid 105. The screen 175, a sieve, or sifter, separates unused litter from urine saturated clumps of litter and feline fecal waste. The mesh includes openings that allow unclumped (unused) litter to pass through, but are too small to allow clumps of litter and feces to pass through. In a nonlimiting example, the screen 175 is comprised of expanded sheet metal, such as expanded steel or aluminum sheet. Such expanded sheet metal is comprised of a sheet with slits that are cut or stamped into the sheet in alternating pattern that has then been stretched open in an accordion-like fashion. This process expands the cuts or slits into diamond shaped apertures of generally uniform size and shape. By way of example and not limitation, the diamond apertures may be roughly from 0.25 to 0.75 (minor [short] width) by 0.5 to 1.5 (major [long] width) inches in minor and major widths, respectively.

While an expanded sheet metal screen is shown, the invention is not limited to such a screen. Other screen materials (e.g., plastic), other screen structures (e.g., woven) and other aperture configurations (e.g., circular, elliptical or rectangular) may be used without departing from the scope of the invention.

In practice, used litter is dumped onto the screen 175. The screen retains clumps of litter and feces because the apertures are too small to allow passage of the clumps and feces. Unused (unclumped) litter falls through the apertures of the screen 175. In practice, an empty litter box is supported by the flanges 180, 185 and 190, 195 of the support frame 130 below the screen 175. Thus, the unused litter falls into the supported litter box below the screen. The clumps of litter and feces retained by the screen are dumped into the trash receptacle by pivoting the lid about the pivot axis of the barrel of the hinges. The clumps and feces slide, roll, tumble and fall from the inclined lid into the trash receptacle.

Figure 8:
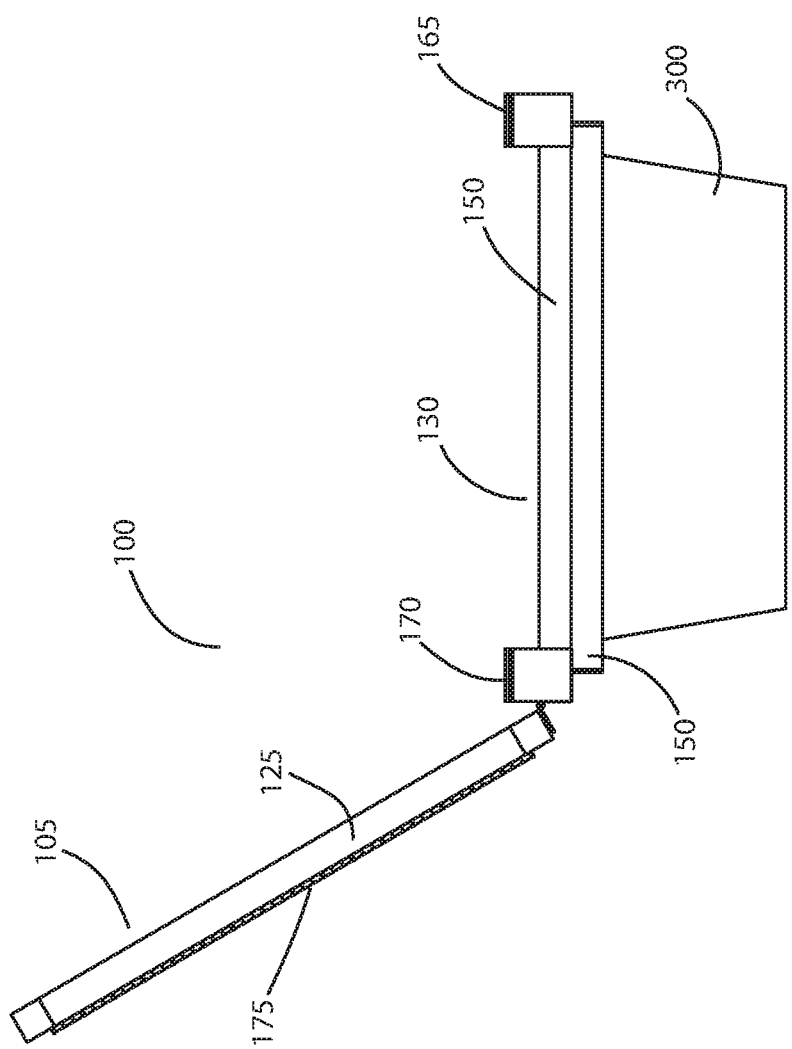
FIG. 8 provides a side view of an exemplary litter sieve assembly in an open position with a suspended litter box according to principles of the invention.
Figure 9:
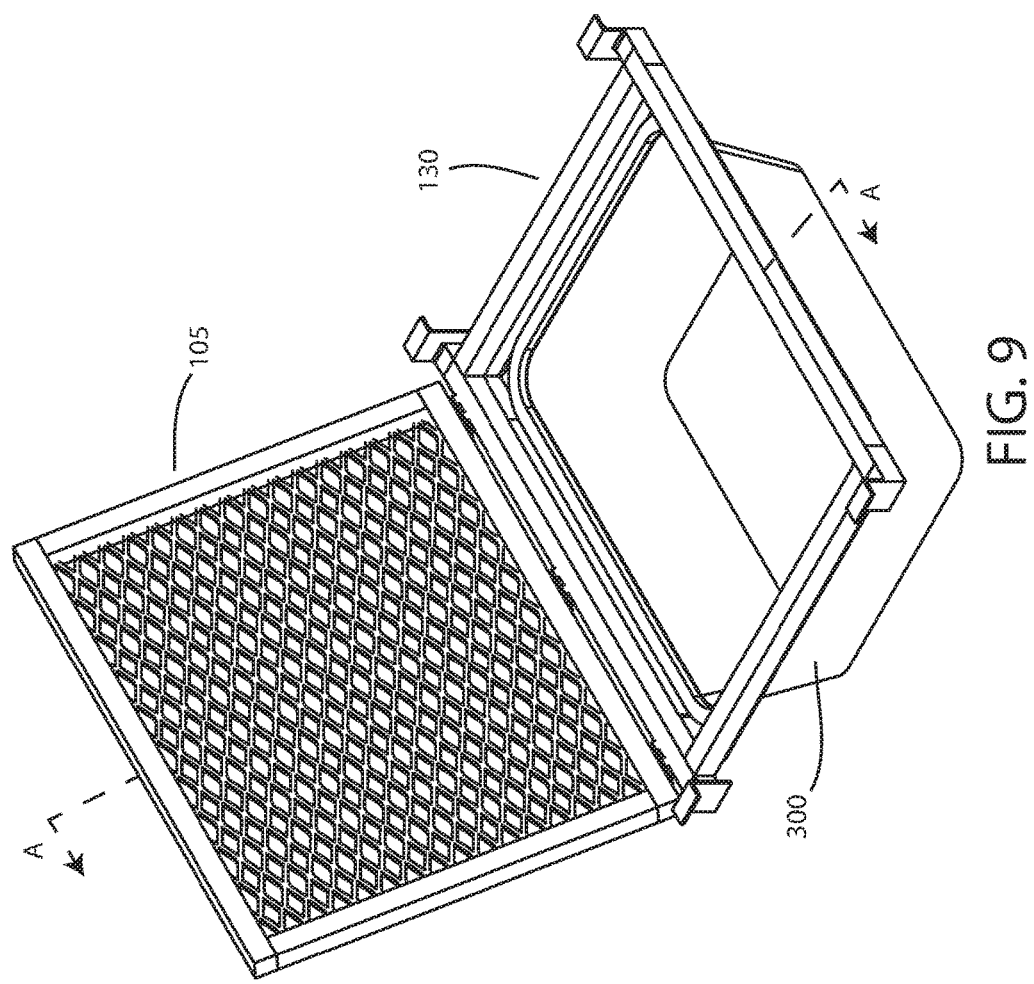
FIG. 9 provides a top front perspective view of an exemplary litter sieve assembly in an open position with a suspended litter box according to principles of the invention.
Figure 10:
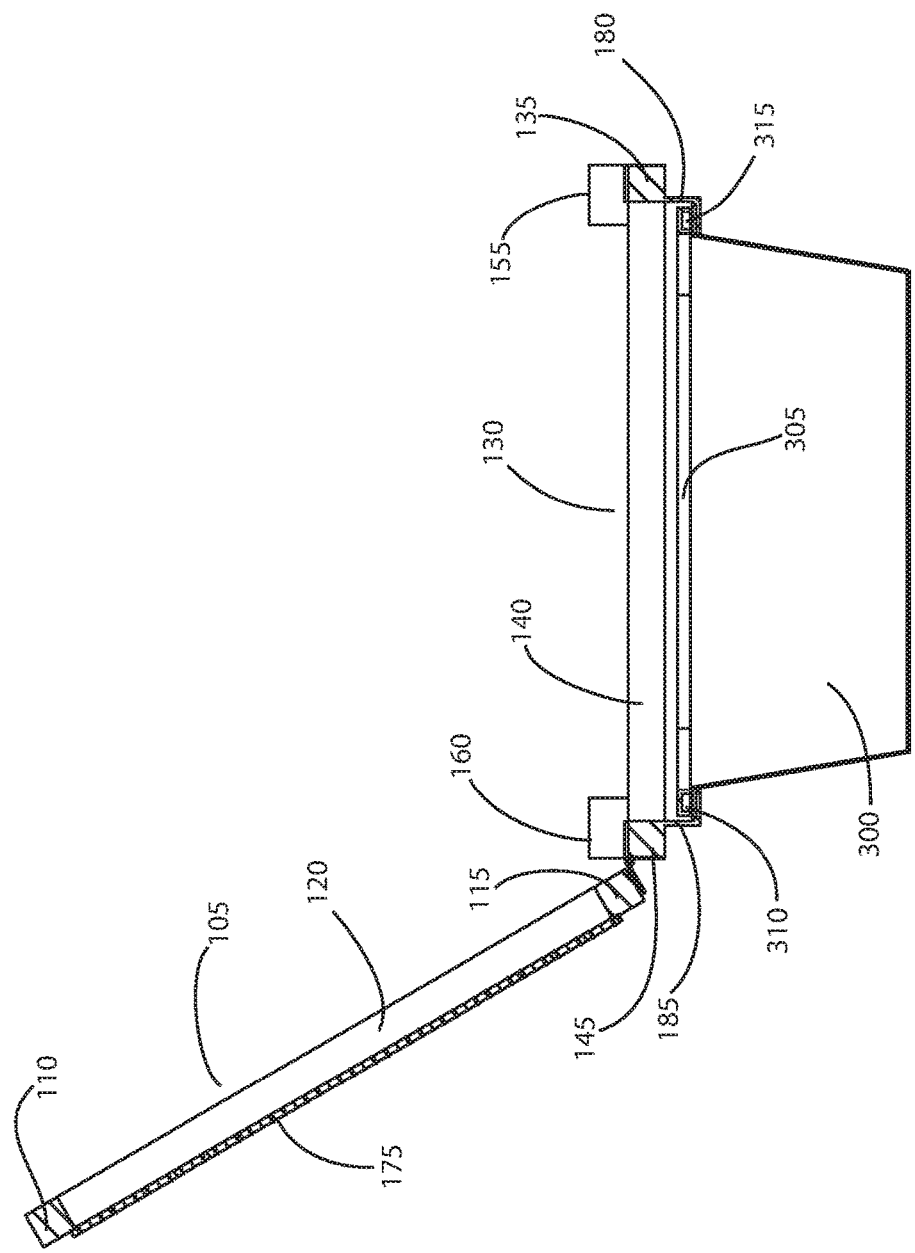
FIG. 10 provides a side section view (A-A, FIG. 9) of an exemplary litter sieve assembly in an open position with a suspended litter box according to principles of the invention.

A litter box 300 may be inserted into the support frame 130 and removed from the support frame 130 when the lid 105 is pivoted to an open position, such as shown in FIGS. 8, 9 and 10. Specifically, an empty litter box 300 may be inserted into the support frame 130 and suspended by the flanges 180, 185 and 190, 195 of the support frame 130 before the lid 105 is closed and used to sift urine soaked clumps and feces from unused litter. As used litter is poured onto the screen 175 of the lid 105, when the lid is in a closed position, as shown in FIGS. 1 through 4 and 13, urine soaked clumps and feces are caught by the screen 175 while unused litter falls through the screen 175 into the box 300. After sifting is completed, the lid 105 is pivoted to an open position, such as shown in FIGS. 8, 9 and 10, whereupon the litter box 300 may be removed from the support frame 130 and used by cats as a cat litter box. If the amount of sifted unused litter is insufficient for use by cats, additional clean litter may be added to the box 300.

Figure 11:
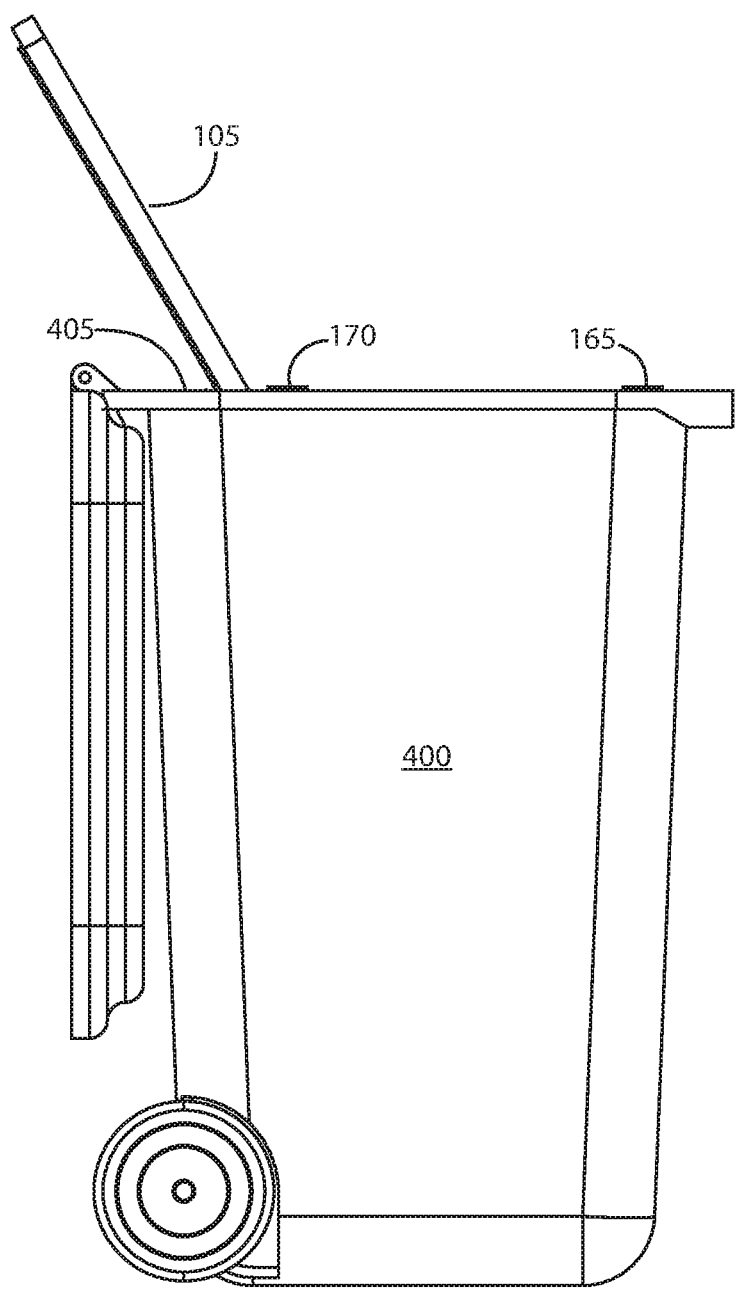
FIG. 11 provides a side view of an exemplary litter sieve assembly in an open position with a suspended litter box suspended in a trash receptacle according to principles of the invention.
Figure 12:
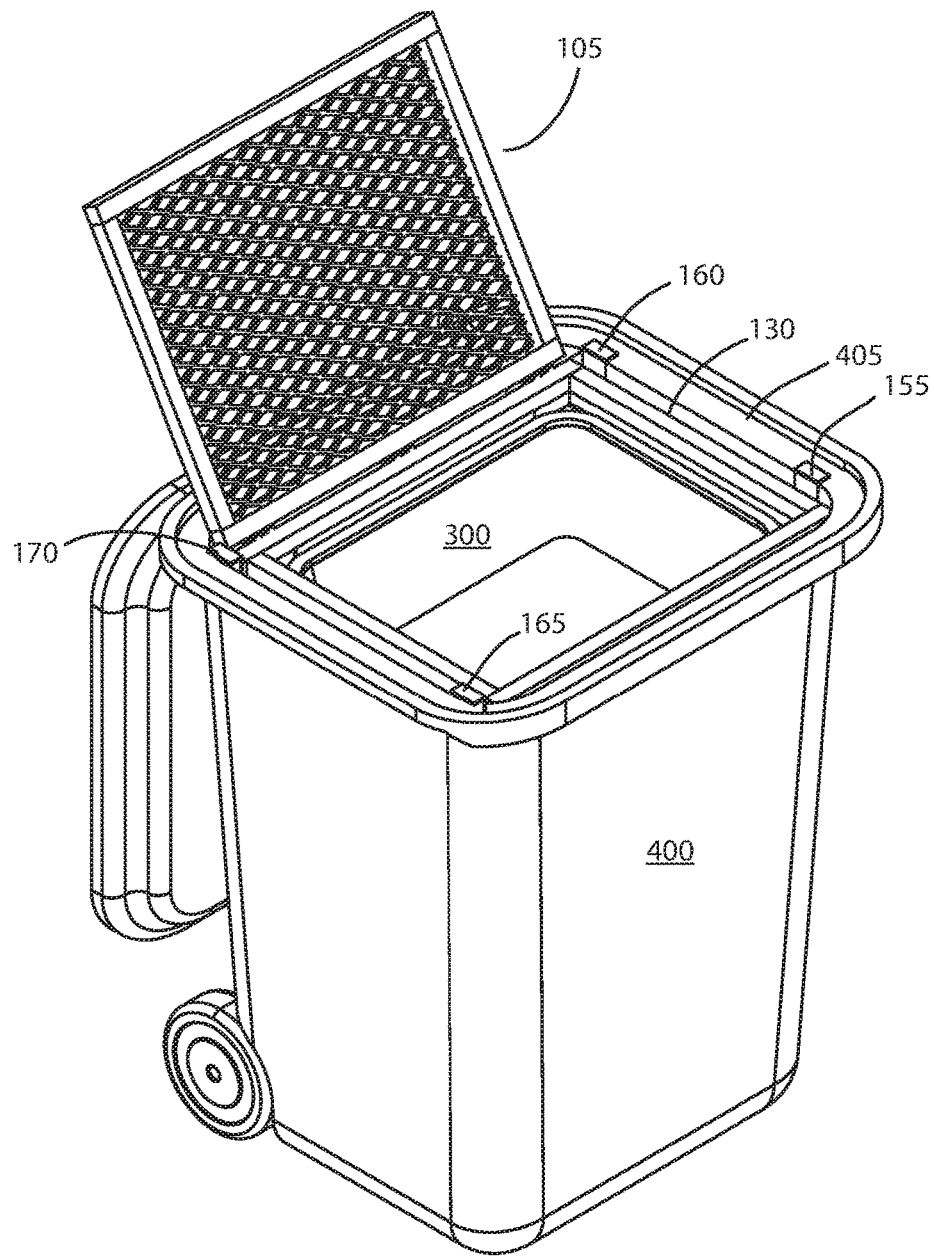
FIG. 12 provides a top front perspective view of an exemplary litter sieve assembly in an open position with a suspended litter box suspended in a trash receptacle according to principles of the invention.
Figure 13:
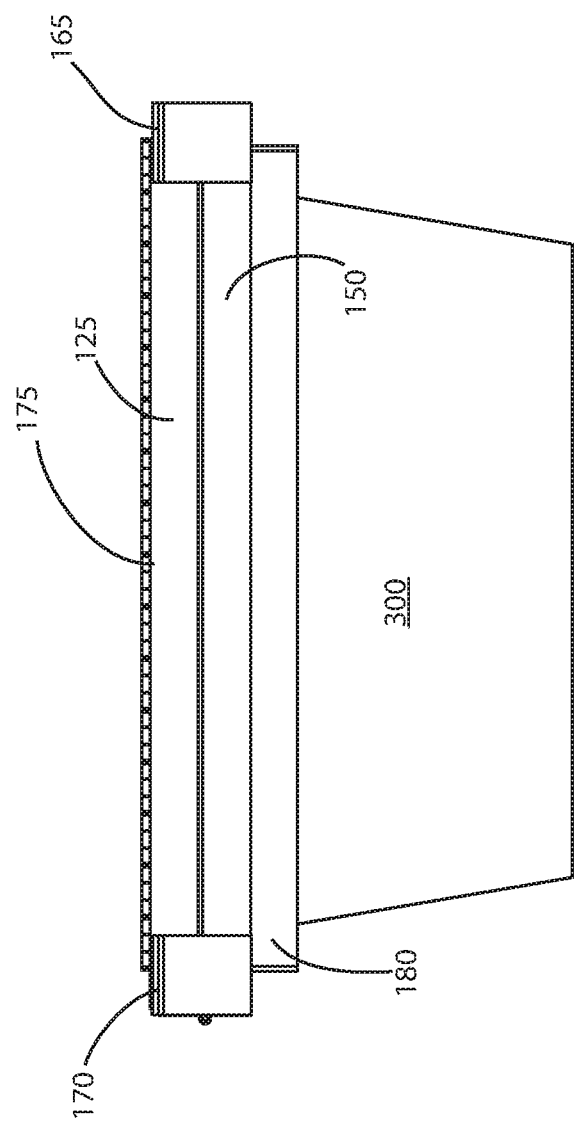
FIG. 13 provides a side view of an exemplary litter sieve assembly in a closed position with a suspended litter box according to principles of the invention.

In FIGS. 11 and 12, the exemplary litter sieve assembly 100 is shown installed on a trash receptacle. The hooks 155, 160, 165, 170 engage a top edge of the trash receptacle 400. The lid 105 is shown in an open position to illustrate a space 405 between the back side 120 of the assembly 100 and the back edge of the trash receptacle. When the lid 105 is raised to the open position, debris may fall (slide, roll or fall) from the lid 105 directly into the trash receptacle 400. Thus, the depth of the assembly 100 as measured from the front edges 110, 135 to the back edges 115, 145, is less than the distance between the front and back edges of the top opening of trash receptacle, leaving adequate room for debris disposal. Dimensions may vary according to the size of the trash receptacle.

Figure 14:
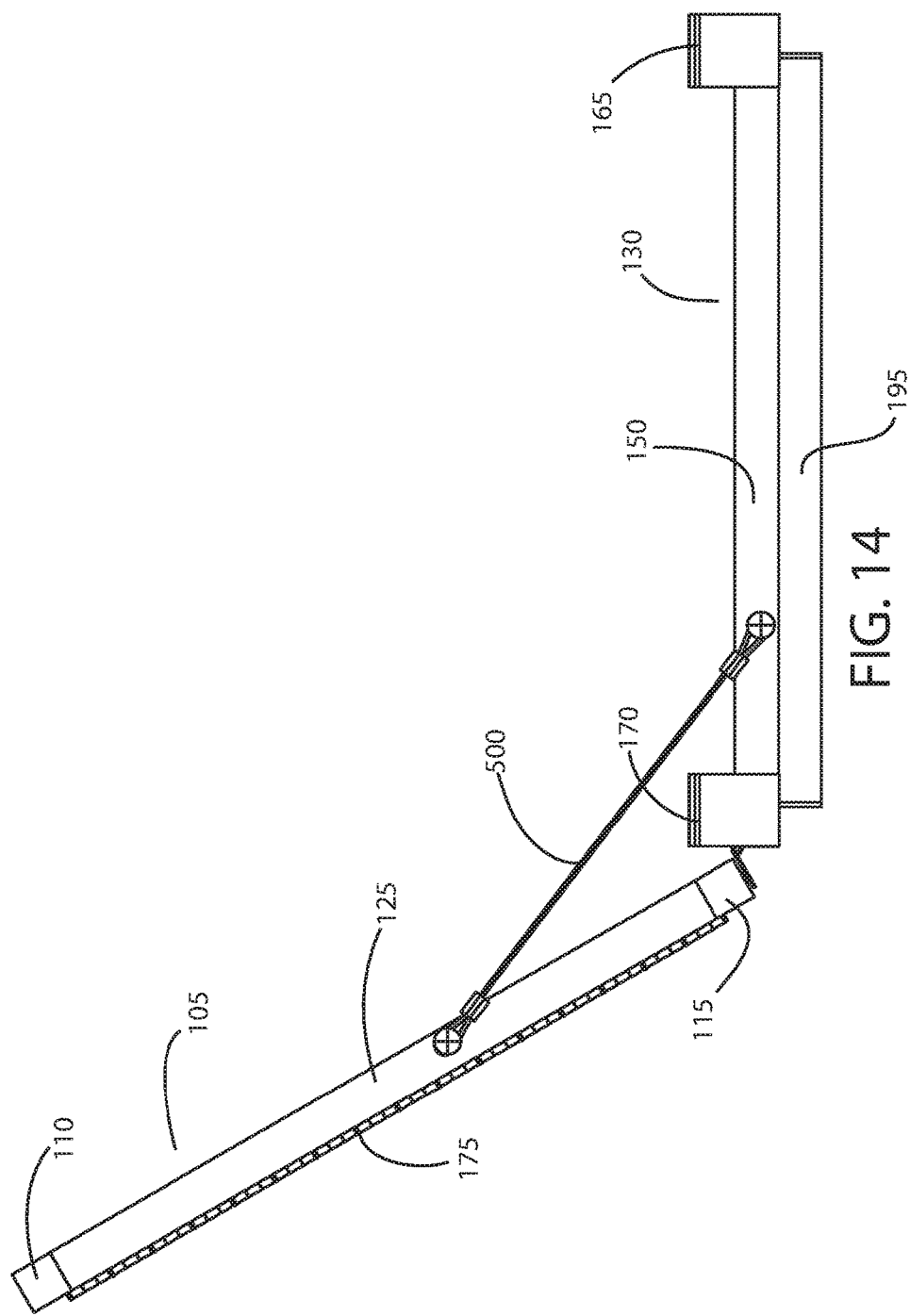
FIG. 14 provides a side view of an exemplary litter sieve assembly with a cable stay in an open position according to principles of the invention.
Figure 15:
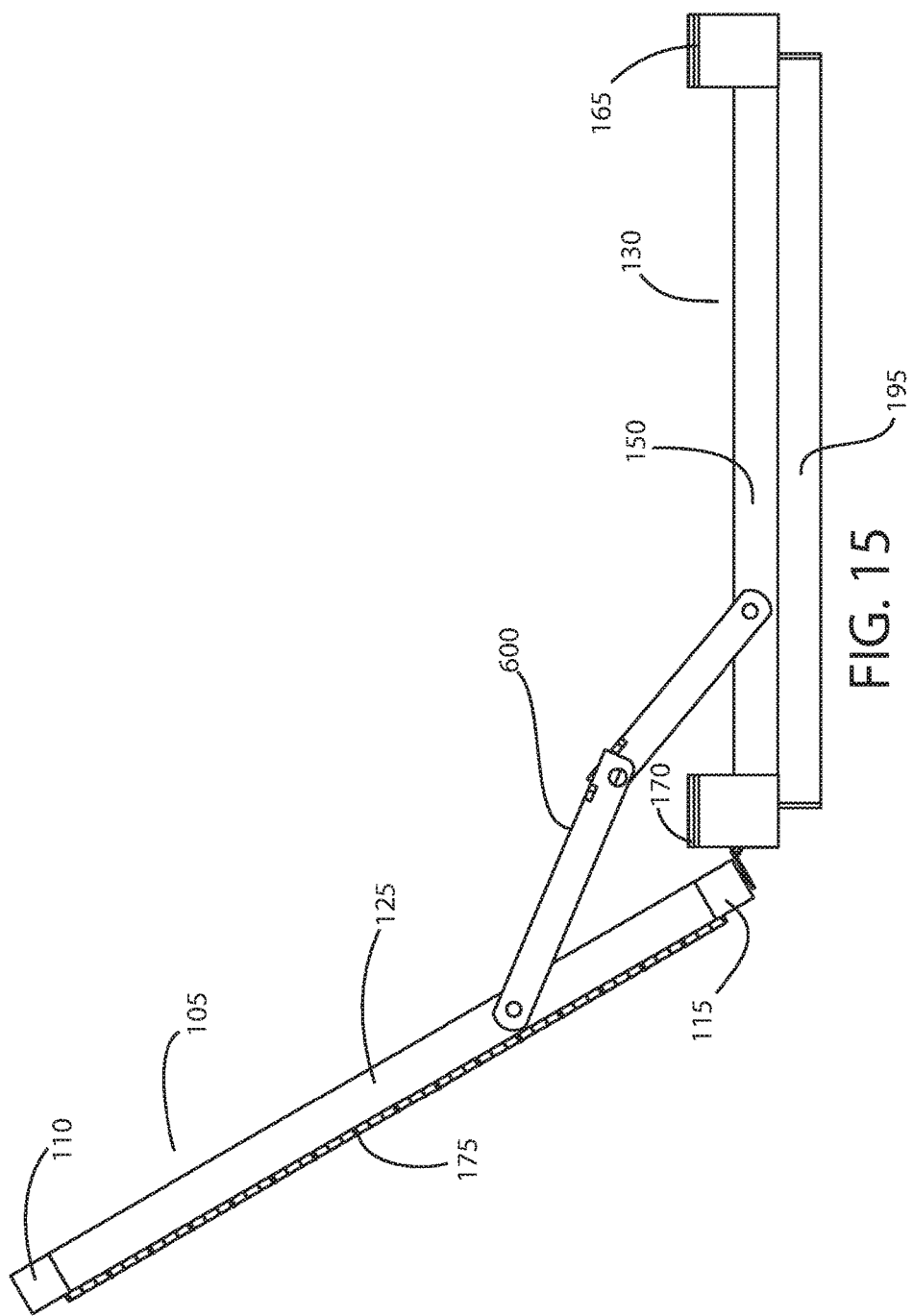
FIG. 15 provides a side view of an exemplary litter sieve assembly with a hinged bracket stay in an open position according to principles of the invention.
Figure 16:
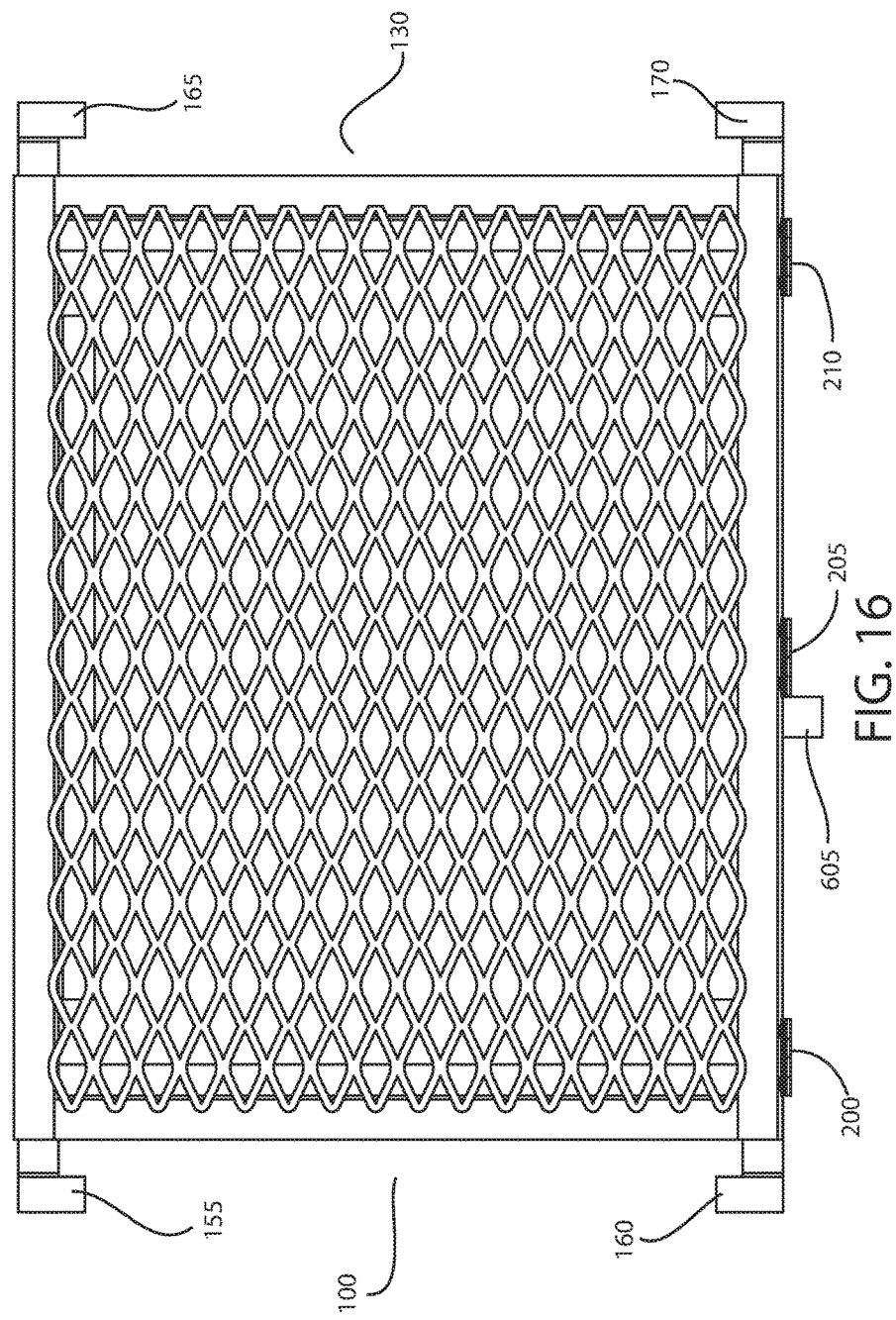
FIG. 16 provides a plan view of an exemplary litter sieve assembly with a lid stop in an closed position according to principles of the invention.
Figure 17:
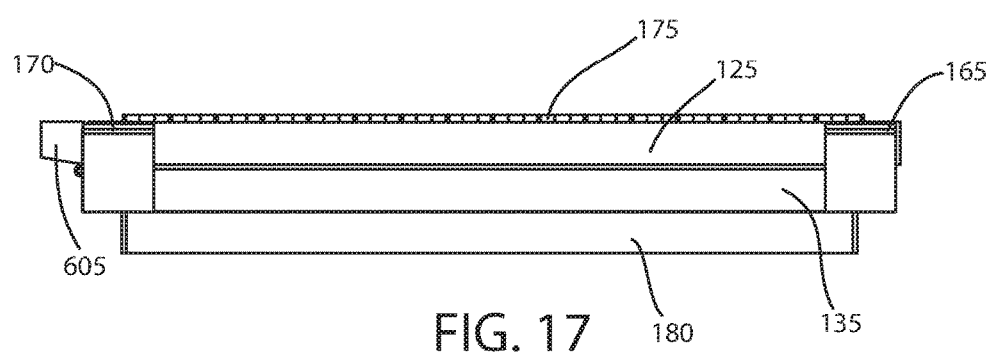
FIG. 17 provides a side view of an exemplary litter sieve assembly with a lid stop in an closed position according to principles of the invention.
Figure 18:
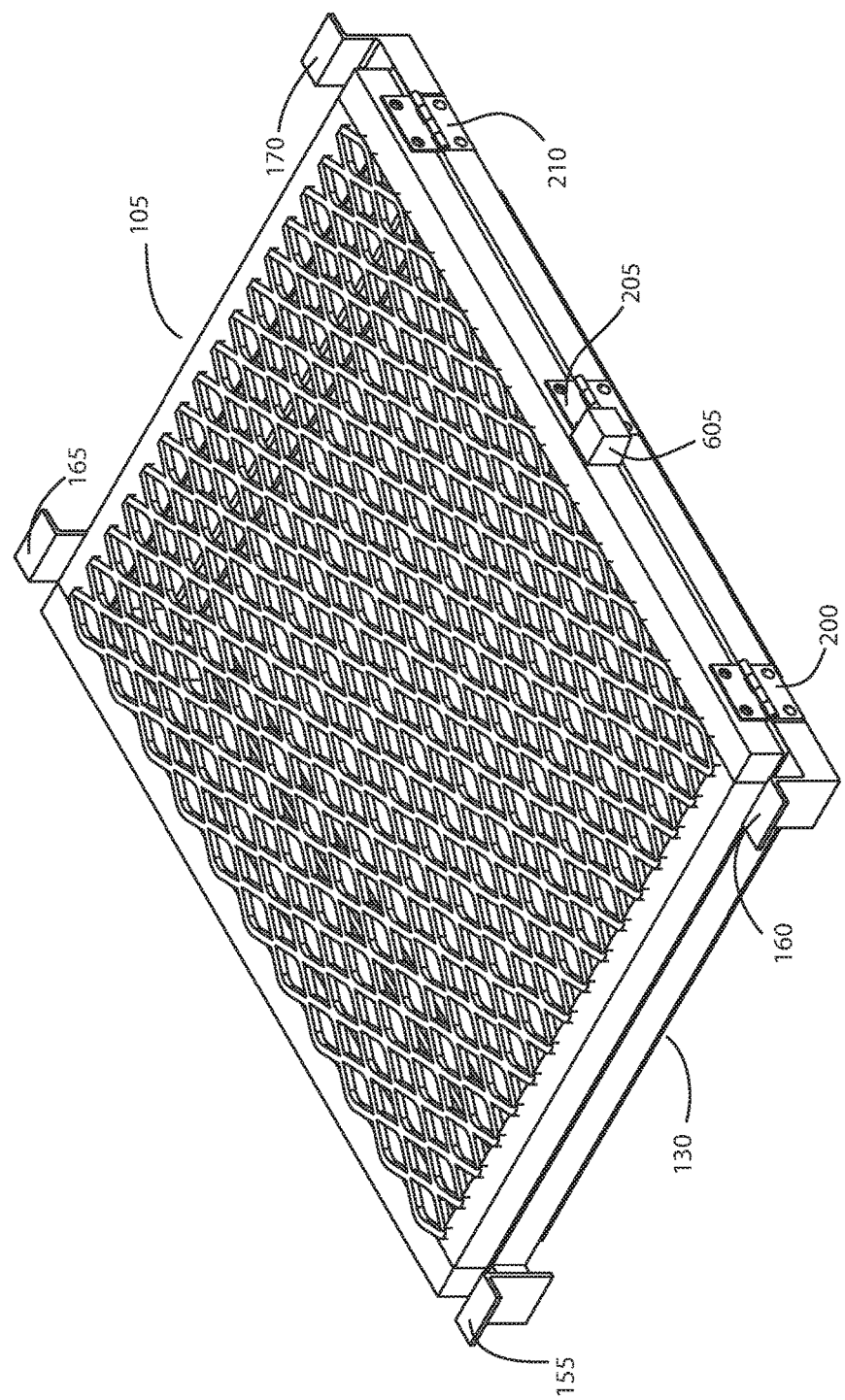
FIG. 18 provides a top back perspective view of an exemplary litter sieve assembly with a lid stop in an closed position according to principles of the invention.
Figure 19:
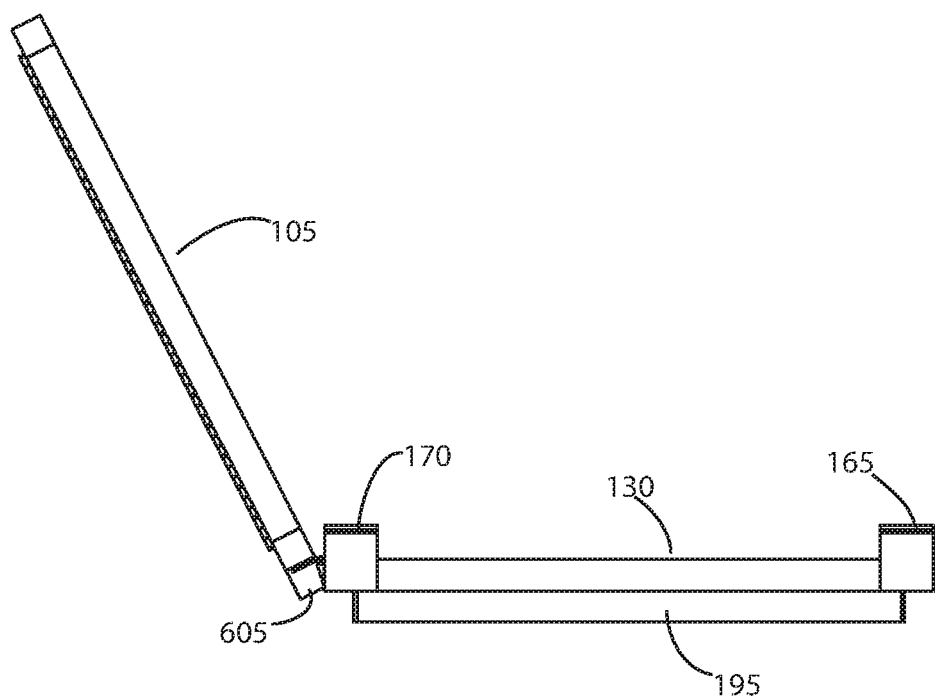
FIG. 19 provides a side view of an exemplary litter sieve assembly with a lid stop in an open position according to principles of the invention.

In FIGS. 14 and 15 embodiments with stays are illustrated. The stays hold the lid 105 in an open position. While a cable stay 500 and hinged bracket stay 600 are shown, other types of stays may be utilized within the scope of the invention. Other stays may include a kickstand or similar spacer too hold the lid 105 in an open position at an acute angle relative to the support frame 130.

FIGS. 16 through 19 illustrate an embodiment with a lid stop 605 attached to the back side of the lid 105 between hinges (e.g., between hinges 200 and 205). When pivoted to an open position, the lid stop 605 contacts the back side of the support frame 130, thereby preventing further pivoting motion of the lid 105. In an exemplary embodiment, the lid stop comprises a protruding prismatic structure, having a surface that contacts the back side of the support frame 130 when the lid 105 pivots to an open position suitable for dumping litter collected on the lid. In a preferred implementation, the angle of the lid relative to the support frame when the lid 105 is fully open is obtuse, and more preferably between 90° and 130°. An obtuse angle maintains the lid 105 in an open position, while an acute angle would allow the lid 105 to fall to a closed position and may not provide an adequate incline for dumping collected clumped litter and feces.

The assembly may be equipped with other accessories. Such other accessories may include one or more handles, spring biased hinges to facilitate opening, cushioning spacers to prevent to absorb impact when closing the lid.

An exemplary litter sieve assembly according to principles of the invention may be comprised of any material that exhibits sufficient rigidity and strength to repeatedly support a litter box and sift dumped litter. By way of example and not limitation, the lid 105 and support frame 130 may be fabricated using metal, plastic, composites, or combinations of any of the foregoing, by any suitable forming technique. For example, the lid 105, support frame 130, either or both, may be comprised of a plastic or polymeric material, such as natural or synthetic rubber, polyvinyl chloride (PVC), nylon, polysulfone, polyethylene, polypropylene, polystyrene, acrylics, cellulosics, acrylonitrile-butadiene-styrene (ABS) terpolymers, urethanes, thermo-plastic resins, thermo-plastic elastomers (TPE), acetal resins, polyamides, polycarbonates and/or polyesters. Preferably the chosen material is relatively inexpensive, produces a durable and strong product, is easy to use in manufacturing operations and results in an aesthetically acceptable product.

The material may optionally further include coatings or additives to provide desired properties such as desired colors, structural characteristics, glow-in-the dark properties and thermal reactivity (e.g., color changes according to heat). Illustratively, phosphorescent polymer additives, such as aluminate based phosphors, may be added to adsorb light energy and continue to release that energy as visible light, after the energy source is removed. Advantageously, such an embodiment provides a glow-in-the-dark structure that is easy to locate in a dark space.

The exemplary litter sieve assembly may be produced using any suitable manufacturing techniques known in the art for the chosen material, such as (for example) casting, forging, milling, extruding, machining, injection molding, compression molding, structural foam molding, blow molding, or transfer molding; polyurethane foam processing techniques; and vacuum forming. Preferably the manufacturing technique is suitable for mass production at relatively low cost per unit, and results in an aesthetically acceptable product with a consistent acceptable quality and structural characteristics.

In one preferred embodiment the lid and support frame are comprised of aluminum, steel or stainless steel, with pieces for each component being fastened together with mechanical fasteners or welds. In another preferred embodiment, the lid and support frame are comprised of plastics.

In practice, two litter boxes are used with an exemplary litter sieve assembly 100 according to principles of the invention. One litter box 300 is suspended from the support frame 130 while the assembly 100 is suspended on the top edges of a trash receptacle 400, as described above. The other litter box contains used soiled litter which will poured onto the screen 175 of the closed lid 105, as described above. After pouring, this other litter box is empty. Clumped litter and feces caught by the screen 175 of the lid 105 are dumped from the lid 105 into the trash receptacle 400 by raising the lid 105 to an open position. Unused litter that passes through the screen 175, falls into the litter box 300 suspended from the support frame 130. That litter box 300 may then be removed from the assembly 100 while the lid is open 105. That litter box, which now contains the unused litter, may be used a cat litter box. The emptied litter box may then be suspended from the support frame 130 while the assembly 100 is suspended on the top edges of a trash receptacle 400 and used to catch unused litter in the future.

While an exemplary embodiment of the invention has been described, it should be apparent that modifications and variations thereto are possible, all of which fall within the true spirit and scope of the invention. With respect to the above description then, it is to be realized that the optimum relationships for the components and steps of the invention, including variations in order, form, content, function and manner of operation, are deemed readily apparent and obvious to one skilled in the art, and all equivalent relationships to those illustrated in the drawings and described in the specification are intended to be encompassed by the present invention. The above description and drawings are illustrative of modifications that can be made without departing from the present invention, the scope of which is to be limited only by the following claims. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents are intended to fall within the scope of the invention as claimed.

What is claimed is:

1. A feline litter box sieve assembly for use with a trash receptacle having an open top and a top edge with a front and opposed back, and a litter box having a top flanged edge, said litter box sieve assembly comprising:
    a support frame being a rectilinear framework sized to fit within the top opening of a trash receptacle, and including opposed front and back sides and opposed first and second sides, and further including a plurality of inwardly extending opposed flanges defining a space therebetween for receiving a litter box having a top flanged edge, and said plurality of inwardly extending opposed flanges beings sized and positioned to support the litter box by the top flanged edge of the litter box; and
    a plurality of suspension hooks attached to the support frame, said suspension hooks being positioned and sized to suspend the support frame from the top edge of the trash receptacle; and
    a lid pivotally attached at the back side of the support frame and including a screen top, the screen top including apertures, the screen top providing a surface onto which used cat litter may be dumped, the lid including opposed front and back sides and opposed left and right sides, the screen top extending from the front side of the lid to the back side of the lid, and from the right side of the lid to the left side of the lid, and the lid being moveable by pivoting from a closed position substantially parallel to and abutting the support frame to an open position at an angle relative to the support frame, the apertures being positioned over the space defined between the inwardly extending opposed flanges when the lid is in the closed position, and the apertures of the screen top being sized to prevent passage of feline feces and clumped litter and to allow passage of unclumped litter; and
    a distance from the front side to the back side of the support frame being less than a distance from a front to an opposed back of a top edge of the trash receptacle, and a waste disposal space behind the back side of the support frame, wherein the waste disposal space is defined when the feline litter box sieve assembly is suspended from the top edge of the trash receptacle.

2. The litter box sieve assembly of claim 1, the lid being pivotally attached at the back side of the support frame with a hinge.

3. The litter box sieve assembly of claim 1, the lid being pivotally attached at the back side of the support frame with a plurality of hinges.

4. The litter box sieve assembly of claim 1, the screen top of the lid comprising expanded metal sheet.

5. The litter box sieve assembly of claim 1, each of the plurality of suspension hooks comprising an inverted L-shaped member with a substantially horizontal top segment and a substantially vertical segment extending downwardly from the substantially horizontal top segment, the substantially vertical segment being connected to the rectilinear framework of the support frame.

6. The litter box sieve assembly of claim 5, each substantially vertical segment being connected to the rectilinear framework of the support frame.

7. The litter box sieve assembly of claim 1, a stay connecting the lid to the support frame and defining a limit of pivoting motion of the lid relative to the support frame.

8. The litter box sieve assembly of claim 1, a handle attached to the lid.

9. The litter box sieve assembly of claim 1, the lid having a front edge, an opposed back edge, a first side edge and an opposed second side edge, and a distance between the front side and back side of the support frame being about the same as a distance between the front edge and back edge of the lid, and a distance between the first side and second side of the support frame being about the same as a distance between the first side edge and second side edge of the lid.

10. The litter box sieve assembly of claim 1, the apertures of the screen top being sized to prevent passage of feline feces and clumped litter.

11. A feline litter box sieve system comprising:
a trash receptacle having an open top and a top edge with a front and opposed back; and
a litter box having a top flanged edge; and
a litter box sieve assembly comprising:
 a support frame being a rectilinear framework sized to fit within the top opening of the trash receptacle, and including opposed front and back sides and opposed first and second sides, and further including a plurality of inwardly extending opposed flanges defining a space therebetween for receiving the litter box, and said plurality of inwardly extending opposed flanges beings sized and positioned to support the litter box by the top flanged edge of the litter box; and
 a plurality of suspension hooks attached to the support frame, said suspension hooks being positioned and sized to suspend the support frame from the top edge of the trash receptacle; and
 a lid pivotally attached at the back side of the support frame and including a screen top, the screen top including apertures, and being moveable by pivoting from a closed position substantially parallel to and abutting the support frame to an open position at an angle relative to the support frame, the apertures being positioned over the space defined between the inwardly extending opposed flanges when the lid is in the closed position; and
 the distance from the front side to the back side of the support frame being less than the distance from the front to the opposed back of the top edge of the trash receptacle;
 the litter box being supported by said plurality of inwardly extending opposed flanges; and
 the support frame being suspended from the top edge of the trash receptacle.

12. The litter box sieve assembly of claim 11, the lid being pivotally attached at the back side of the support frame with a hinge.

13. The litter box sieve assembly of claim 11, the lid being pivotally attached at the back side of the support frame with a plurality of hinges.

14. The litter box sieve assembly of claim 11, the screen top of the lid comprising expanded metal sheet.

15. The litter box sieve assembly of claim 11, each of the plurality of suspension hooks comprising an inverted L-shaped member with a substantially horizontal top segment and a substantially vertical segment extending downwardly from the substantially horizontal top segment, the substantially vertical segment being connected to the rectilinear framework of the support frame.

16. The litter box sieve assembly of claim 15, each substantially vertical segment being connected to the rectilinear framework of the support frame by a coupling, said coupling extending outwardly from the rectilinear framework of the support frame.

17. The litter box sieve assembly of claim 11, a stay connecting the lid to the support frame and defining a limit of pivoting motion of the lid relative to the support frame.

18. The litter box sieve assembly of claim 11, a handle attached to the lid.

19. The litter box sieve assembly of claim 11, the lid having a front edge, an opposed back edge, a first side edge and an opposed second side edge, and a distance between the front side and back side of the support frame being about the same as a distance between the front edge and back edge of the lid, and a distance between the first side and second side of the support frame being about the same as a distance between the first side edge and second side edge of the lid.

20. The litter box sieve assembly of claim 11, the apertures of the screen top being sized to prevent passage of feline feces and clumped litter.

* * * * *